(12) United States Patent
Coburn et al.

(10) Patent No.: US 10,572,872 B2
(45) Date of Patent: Feb. 25, 2020

(54) DECENTRALIZED COMPETITIVE ARBITRATION USING DIGITAL LEDGERING

(71) Applicant: FirstBlood Technologies, Inc., Everett, MA (US)

(72) Inventors: Zachary Robert Coburn, Chicago, IL (US); Chuhao Zhou, Everett, MA (US)

(73) Assignee: FirstBlood Technologies, Inc., Everett, MA (US)

( * ) Notice: Subject to any disclaimer, the term of this patent is extended or adjusted under 35 U.S.C. 154(b) by 115 days.

(21) Appl. No.: 15/861,948

(22) Filed: Jan. 4, 2018

(65) Prior Publication Data
US 2018/0197172 A1   Jul. 12, 2018

Related U.S. Application Data

(60) Provisional application No. 62/443,086, filed on Jan. 6, 2017.

(51) Int. Cl.
*A63F 13/00* (2014.01)
*G06Q 20/38* (2012.01)
(Continued)

(52) U.S. Cl.
CPC ........... *G06Q 20/389* (2013.01); *A63F 13/75* (2014.09); *A63F 13/79* (2014.09); *A63F 13/792* (2014.09);
(Continued)

(58) Field of Classification Search
CPC .... G06Q 20/02; G06Q 20/389; G06Q 20/401; G06Q 2230/00; G06Q 30/0209;
(Continued)

(56) References Cited

U.S. PATENT DOCUMENTS 6,443,841 B1 *  9/2002  Rossides ............. F21V 19/0085
                                                        463/16
7,367,888 B1 *  5/2008  Chen ....................... A63F 13/12
                                                        463/42
(Continued)

FOREIGN PATENT DOCUMENTS

WO    WO2016073589 A1    5/2016

OTHER PUBLICATIONS

Cassano, Jay, "What are Smart Contracts? Cryptocurrency's Killer App", [dated Sep. 17, 2014]. [online], [retrieved Jun. 22, 2019]. Retrieved from the Internet, https://www.fastcompany.com/3035723/smart-contracts-could-be-cryptocurrencys-killer-app (9 pages).*
International Search Report dated Apr. 27, 2018 for PCT/US2018/012286.

*Primary Examiner* — Lawrence S Galka
(74) *Attorney, Agent, or Firm* — Adams Intellex, PLC

(57) ABSTRACT

Disclosed techniques enable arbitration of electronic competitions using digital ledgering. A digital competition arbitration platform is based on secure, trusted digital ledgering techniques. Users who seek to compete in digital games and eSports subscribe to the arbitration platform. A competition between users employs a digital contract. The contract is executed using a digital ledger token. The outcome of the competition between players is verified based on input from both the competitors and randomly selected witnesses. When a dispute occurs between the players, a juror pool reviews evidence and witness results. Payouts are made based on the digital contract and the adjudged competition result. Compensation is provided to jurors and witnesses.

26 Claims, 13 Drawing Sheets

(51) Int. Cl.
*G06Q 20/42* (2012.01)
*A63F 13/79* (2014.01)
*A63F 13/792* (2014.01)
*A63F 13/75* (2014.01)
*A63F 13/828* (2014.01)
*A63F 13/816* (2014.01)
*A63F 13/86* (2014.01)

(52) U.S. Cl.
CPC ............ *G06Q 20/42* (2013.01); *A63F 13/816* (2014.09); *A63F 13/828* (2014.09); *A63F 13/86* (2014.09)

(58) Field of Classification Search
CPC ....... G06Q 50/34; A63F 13/75; A63F 13/352; A63F 13/792; A63F 2300/5586; A63F 3/00157; G07F 17/3244; G07F 17/3276; G07F 17/3279; G07F 17/3288; H04L 9/3247; H04L 2209/38; H04L 2209/463; H04L 2209/56; H04L 63/08; H04L 67/20; H04L 9/0894; H04L 9/321; H04L 9/3255; G07C 13/00
See application file for complete search history.

(56) References Cited

U.S. PATENT DOCUMENTS

| | | | |
|---|---|---|---|
| 9,298,806 B1 | 3/2016 | Vessenes et al. | |
| 9,635,000 B1 | 4/2017 | Muftic | |
| 9,659,439 B1* | 5/2017 | Aleksey | G07F 17/3227 |
| 9,667,427 B2 | 5/2017 | Oberhauser et al. | |
| 2007/0265092 A1* | 11/2007 | Betteridge | G07F 17/32 463/42 |
| 2009/0170604 A1* | 7/2009 | Mueller | A63F 13/12 463/42 |
| 2011/0196723 A1 | 8/2011 | Baszucki et al. | |
| 2015/0209678 A1* | 7/2015 | Edwards | A63F 13/792 463/25 |
| 2016/0292680 A1* | 10/2016 | Wilson, Jr. | G06Q 20/02 |
| 2017/0001115 A1 | 1/2017 | Melinger et al. | |
| 2017/0103391 A1 | 4/2017 | Wilson, Jr. et al. | |
| 2017/0109955 A1 | 4/2017 | Ernest et al. | |
| 2017/0111175 A1 | 4/2017 | Oberhauser et al. | |
| 2017/0116693 A1 | 4/2017 | Rae et al. | |
| 2017/0124535 A1 | 5/2017 | Juels et al. | |
| 2017/0126702 A1 | 5/2017 | Krishnamurthy | |
| 2017/0140145 A1 | 5/2017 | Shah | |
| 2017/0154331 A1 | 6/2017 | Voorhees | |
| 2018/0043265 A1 | 2/2018 | Edwards et al. | |

* cited by examiner

DECENTRALIZED COMPETITIVE ARBITRATION USING DIGITAL LEDGERING

RELATED APPLICATIONS

This application claims the benefit of U.S. provisional patent applications "Competitive Arbitration using Digital Ledgering" Ser. No. 62/443,086, filed Jan. 6, 2017. The foregoing application is hereby incorporated by reference in its entirety.

FIELD OF ART

This application relates generally to distributed computing-based digital interaction and more particularly to decentralized competitive arbitration using digital ledgering.

BACKGROUND

Electronic games have been popular for nearly as long as the existence of digital computers. System operators and users alike enjoy spending hours exploring imaginary worlds, slaying dragons, rescuing people, solving puzzles, and more. The earliest electronic games were text-based or "teletype" games that included such classics as Dungeon™, Adventure™, and Zork™. The games were played by reading printed text and typing in text. With the advent of video displays such as the Digital Equipment Corporation (DEC) VT-100™, the printer-based versions of the games quickly evolved into video versions. Players were able to read and enter text and see primitive video renderings of the virtual worlds described in the games. Electronic handheld versions of games also became popular. Early examples of such electronic games include Simon™ and Merlin™. These self-contained electronic games could be carried and played remotely by the user while away from a terminal.

Electronic games continued to evolve. With the widespread introduction of inexpensive digital hardware, powerful electronic games such as "arcade games" emerged. Games such as Pong™, Space Invaders™ and Pacman™ were widely played. Some of the arcade-style games were implemented with special hardware such as multiple CPUs, specialized audio, and video projectors. The games also used special input devices including steering wheels, dance mats, guns, fishing rods, and more. Other input devices have been added that closely resemble objects manipulated while playing the games. These devices include aircraft cockpits and automobiles, motorcycles, and animals, to name a few, and they permit the user to more fully immerse herself or himself in the gaming experience. Other gaming innovations include computer or "PC" games and console games. PC games are played on a personal computer and include interactive video and audio. Console games have further advanced the gaming experience with special audio and visual effects. These latter games are typically played using a wide screen television and a multichannel audio system. More recent gaming innovations include the addition of headphones, microphones, and video goggles. The video goggles permit the game players to engage in augmented reality and virtual reality gaming scenarios.

Likely the most exciting innovation in electronic gaming is the online game. This classification of game is played over the Internet, wireless networks, or other networks, and allows multiple players to interact within the game. The games are hosted on a game server or game site and can be played on personal computers, game consoles, and mobile devices. Many types of games can be played online including first-person shooter games, multiplayer games, strategy games, team games, role playing games, adventure games, and others. Some of the games include in-game purchases, hints, and more. The games are basic text-based games, video games, augmented reality (AR) games, and virtual reality (VR) games. The AR and VR games often include extensive graphics and audio tracks which together create substantial virtual worlds. Other games are based on social structures and merge the AR and VR worlds with the real-life communities of the players.

SUMMARY

Disclosed techniques enable arbitration of competitive online games and eSports activities based on a digital competition arbitration platform. The digital competition arbitration platform supports competitive play between groups of online users and provides payouts of fees and winnings using a digital ledger currency. In order to compete in online games and eSports activities, users subscribe to the digital competition arbitration platform. Users can include a first user group and a second user group, where the first user group can be a single user or a plurality of users, and the second user group can be a single user or a plurality of users. The first user group and the second user group agree to a digital competition. A digital contract that pertains to a result from the digital competition is executed using a digital ledger currency. The digital contract is executed between the first user group and the second user group. The first user group and the second user group remit payment by using digital ledger currency to execute the digital contract. The execution of the digital contract comprises a wager.

The first user group and the second user group engage in the digital competition. The result of the digital competition is validated by collecting input from the first user group and input from the second user group. The competition between the first user group and the second user group is observed or witnessed by a third user group. The third user group further verifies, or validates, the result from the digital competition. The witness operation is performed through an automated evaluation application or bot. The collected input from the first user group and the collected input from the second user group can be in dispute when the first user group and the second user group each believe that they won the competition. The dispute between the first user group and the second user group is arbitrated using a fourth user group. The fourth user group is provided with evidence from the first user group and evidence from the second user group. The fourth group is presented with witness results from the third user group. The fourth user group (or "jurors") votes on the result of the digital competition.

The digital competition arbitration platform pays out compensation based on the digital contract. The payouts include winnings to the user group that does indeed win the competition, fees to witnesses, and fees to the digital competition arbitration platform. The payouts can also include fees to the fourth user group which acts as the jury. The payouts to the fourth user group (jurors) can depend on how the jurors voted in the arbitration. A first subset of jurors that voted in a majority as part of the arbitrating can be compensated. A second subset of jurors that voted in a minority as part of the arbitrating can be determined. The second subset of jurors that voted in the minority might not be compensated or might be compensated negatively. The compensation for the arbitrating can be accomplished using the digital ledger token.

Embodiments include a computer-implemented method for competitive arbitration comprising: subscribing, using a first computing device, a first user group and a second user group to a digital competition arbitration platform that oversees a digital competition; executing, using a second computing device, a digital contract using a digital ledger token between the first user group and the second user group, wherein the digital contract pertains to a result from the digital competition; and validating, using a third computing device, the result of the digital competition by collecting input from the first user group, the second user group, and a third user group. In embodiments, the third user group comprises one or more witness users. In embodiments, the third user group verifies the result from the digital competition. In embodiments, the one or more witness users perform a witness operation through an automated evaluation application. Some embodiments further comprise arbitrating a dispute between the first user group and the second user group over the result from the digital competition using a fourth user group that votes on the result from the digital competition.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
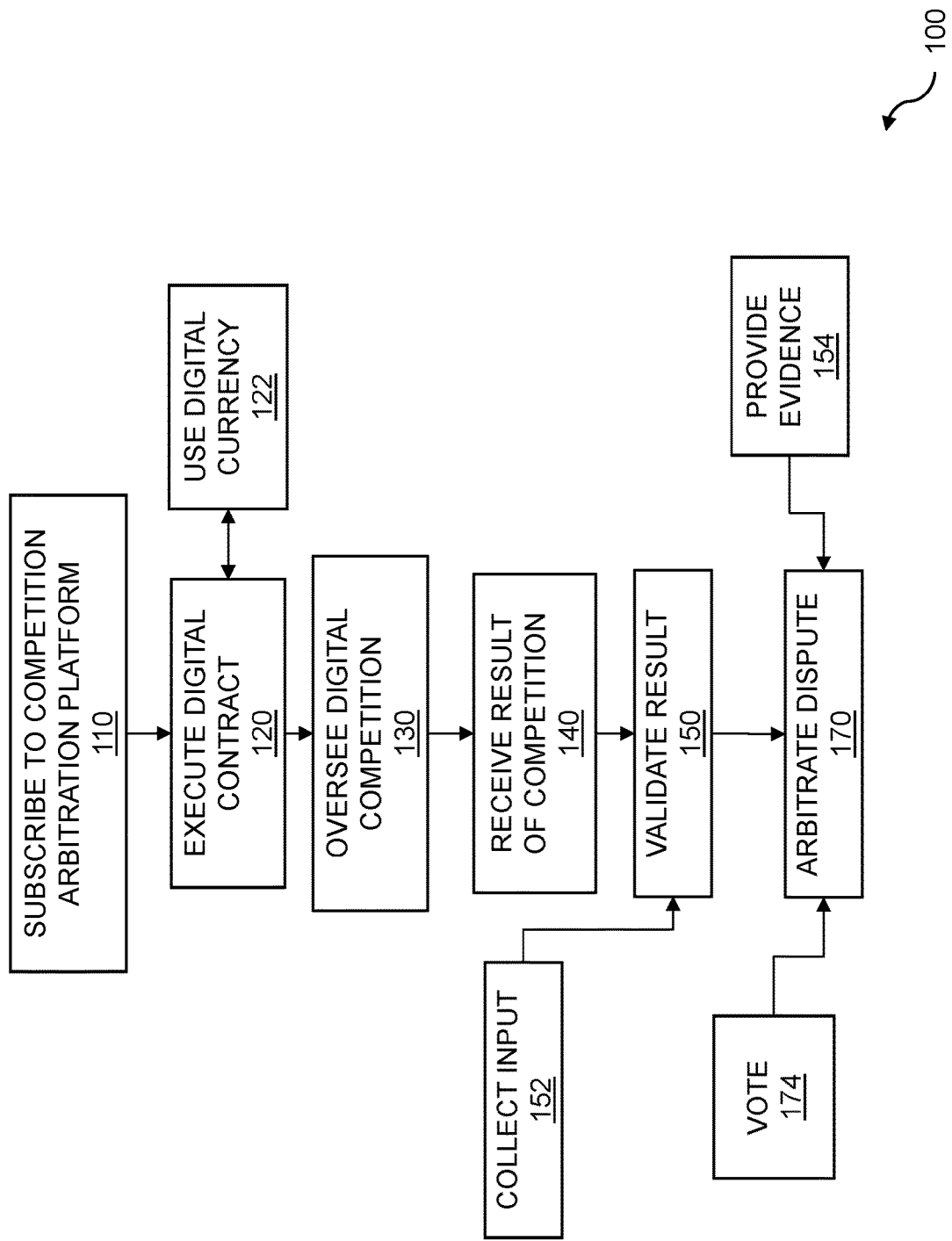
FIG. 1 is a flow diagram for competitive arbitration.

Decentralized competitive arbitration is the process of determining a winner for an on-line, digital engagement without using a centralized authority. A digital engagement, or digital competition, can take the form of an electronic game. An online digital competition can take many forms. In some instances, it can take the form of a sports or action game, commonly called eSports. A digital competition can involve a human participant against a game, a human participant against another human participant, or a plurality of human participants against another plurality of human participants. A digital competition can take the form of fantasy site games and major league prize pools. A digital competition can take the form of tournament pools, such as an NCAA basketball tournament prize pool. There are many such digital competitions, and, of course, determining a winner is a critical component of any digital competition.

The winner of a digital competition might receive an award for winning the competition. Such compensation for the winner must be fairly and efficiently awarded in order to maintain the integrity of the digital competition. In all competitive situations, and especially in highly competitive digital engagements, it must be apparent that the identified winner is indeed the valid winner. Unfortunately, as in many areas of life, there might be either honest or even dishonest disagreement over the outcome of the event. There is always the potential for mistakes or even cheating to take place in a competitive event. Even in national societal events that have hundreds of years of history, such as the quadrennial United States presidential election, the certification, or if need be, the arbitration, of the proper winner can be complicated. Certification or arbitration of a digital competition is likewise complicated, and it is therefore crucial to have a means to arbitrate the outcome of a digital competition in a fair, efficient, and satisfying manner.

In many societies, arbitration of judicial complaints, or in a manner of speaking, judicial competitions, are performed via the agency of witnesses and jury. Arbitration of digital competition can be understood by borrowing judicial terms for descriptive benefit, but an entirely new structure and approach is developed herein for digital competition arbitration. An arbitration platform allows subscription to a digital contract, which is enabled via a digital token. A digital contract is executed to oversee the digital competition. The result of the digital competition is validated and, if necessary, arbitrated by witnesses and a jury. Digital currency can be used. A decentralized eSports gaming application is provided to enable fast, secure, and reliable processing of digital competition result and reward. All of the application's transactions are publicly verifiable, viewable, resistant to counterfeit, and without the risk of centralized, institutional processing. Blockchain technology is integrated into the application infrastructure to provide for secure transactions.

After players, or parties, agree to a match, witnesses can be identified to validate the result of the match, according to a smart contract for the digital competition match. After the competition is complete, witnesses can provide a result. If both parties agree with the witness results, then several checks are performed and the smart contract enables appropriate payout of a reward. However, if one or more of the players or parties disagrees with the witness results, then jurors can be requested and randomly selected. The jurors review the evidence and send their results to the digital arbitration system. The jurors can be compensated for their role in providing their vote for the evidence review and arbitration. Digital ledger currency can be used to provide payout and juror compensation. The integrity of the digital ledger currency can be maintained through blockchain technology.

FIG. 1 is a flow diagram for competitive arbitration. The competitive arbitration comprises a digital competition arbitration platform that oversees a digital competition and can include a decentralized system for digital competition result validation and arbitration. The digital competition can be an eSports game, such as League of Legends™ or Dota 2™, to name just two. The digital competition can be referred to as a match. The digital competition can comprise an online game. The digital competition can comprise an eSports activity. The flow 100 can include subscribing to an arbitration platform 110. The digital arbitration platform can provide a decentralized infrastructure for validation and arbitration of a match between users. The digital competition can be on a separate digital platform from the digital competition arbitration platform. The digital competition arbitration platform can be decentralized. In embodiments, the subscribing to a competition arbitration platform is accomplished using a first computing device. In embodiments, the first computing device comprises a matchmaking server. In embodiments, the matchmaking server is centralized within the decentralized system for digital competition.

The subscribing to an arbitration platform 110 can comprise one or more subscriptions. The subscriptions can be for a first user group and a second user group. The user groups can be comprised of an individual or a plurality of individuals or a combination of both. The first user group can comprise a single user. The first user group can comprise a plurality of users. The second user group can comprise a single user. The second user group can comprise a plurality of users.

The flow 100 can include executing a digital contract 120. The digital contract 120 can comprise a digital ledger token. The digital ledger token can comprise a digital ledger currency 122. The digital ledger token can be referred to as a medium of exchange. The digital ledger token can comprise a plurality of individual tokens. The digital ledger token can comprise cryptocurrency. The digital currency can include Ethereum™ digital currency, which allows for the creation of digital smart contracts. The digital ledger token can comprise Ethereum™. Other digital currencies, such as Bitcoin™, can also be employed. The digital ledger token can comprise blockchain technology. The digital contract that was executed can provide a platform, or framework, with which to oversee digital competition 130. The digital contract can comprise a smart contract. The smart contract can comprise a wager. The digital contract can be maintained using blockchain technology. The data associated with the digital contract can be maintained using blockchain technology.

The executing a digital contract 120 can be accomplished using a second computing device. In embodiments, the digital contract that is executed can comprise a digital ledger transaction that requests the result of a digital competition between a first user group and a second user group. In embodiments, the digital ledger transaction can be accomplished on a single digital device or using multiple devices. In embodiments, the digital ledger transaction comprises a decentralized system for digital competition result validation and arbitration. In embodiments, the first computing device and the second computing device are a common device. In some embodiments, the second computing device is an arbitration server. In embodiments, the arbitration server handles matchmaking between the first user group and the second user group.

The flow 100 can include receiving the result of competition 140. The result can include a winner and a loser for a digital competition match. The result can include a tie for a match. The result can include any other possible outcome of a digital competition, according to the design of the competition. In embodiments, results are received from the digital competition between the first user group and the second user group. The flow 100 can include validating the result 150. The validation can include collecting input 152 from the first user group and the second user group. The validation can include collecting input 152 from a third user group. The third user group can comprise one or more witness users. The witness users, or witnesses, can be people running an automated witness node application that is part of the decentralized computing framework for digital competition validation and arbitration. The third user group can verify the result from the digital competition. The third user group of witnesses who validates the result can, by their validation, greatly reduce the risk of fraudulent match result reporting. The one or more witness users can perform a witness operation through an automated evaluation application. Payouts can be awarded to the winner as the reward for winning the match based on player reports and the witness input. The third user group can be compensated for the validating. The compensation for the validating can be accomplished using the digital ledger token. In embodiments, the result is received by the third user group.

The validating the result 150 can be accomplished using a third computing device. In embodiments, the third computing device comprises multiple computing devices. In embodiments, the multiple computing devices are each owned by multiple witnesses. In embodiments, the witnesses' computing devices are each used to run an automated evaluation application that looks up the result of a digital competition and reports the result to the digital contract. In embodiments, the first computing device can then look up the result, as reported by the witnesses in the digital ledger, and use it to "resolve" the match in a matchmaking server. The matchmaking server can resolve the match by moving funds to the winner, paying the witnesses for their service, providing negative compensation for witnesses deemed to be invalid, and so on.

In embodiments, the second computing device and the third computing device are a common device. In other embodiments, the first computing device and the third computing device are a common device. In yet other embodiments, the first computing device, the second computing device, and the third computing device are all a common device. A common device comprises a computing device with substantially the same physical processor hardware, such as a computer processor semiconductor chip with one or more cores, or a computer processor multichip module housing one or more instances of a common processor semiconductor chip or two or more instances of complementary computer processor semiconductor chips, or a physically distinct server computer system or server computer building block, such as a rack-mounted server computer.

The flow 100 can include arbitrating a dispute 170. A dispute can occur when one or both of the participants disagrees with the validated result. The arbitration can be performed by an online jury selected by a weighted, random selection process. In some embodiments, arbitrating a dispute between the first user group and the second user group over the result from the digital competition uses a fourth user group that votes on the result from the digital competition. The fourth user group can comprise a jury pool. The flow 100 can include providing evidence 154. The evidence can include input from the witnesses as well as additional evidence, such as screenshots, from the match participants. The flow 100 can include voting of the jury 174 based on the evidence. The first user group can provide evidence in support of a position by the first user group in the dispute. The second user group can provide evidence in support of a position by the second user group in the dispute. In embodiments, fourth user group is compensated for the arbitrating.

In embodiments, the digital ledger contract can randomly select one or more witnesses from a pool of witnesses. In embodiments, the random selection can be skewed into a modified random selection. The modified random selection can be skewed proportionately to the number of digital ledger tokens the witness has provided to, or "staked," in the digital ledger contract. Digital ledger token balances are kept in a centralized database. In embodiments, all transactions are replicated in the digital ledger. Transactions that are replicated in the digital ledger can be publicly viewable.

The flow 100 can include a computer-implemented method for competitive arbitration comprising: subscribing a first user group and a second user group to a digital competition arbitration platform that oversees a digital competition; executing a digital contract using a digital ledger token between the first user group and the second user group wherein the digital contract pertains to a result from the digital competition; and validating the result of the digital competition by collecting input from the first user group and the second user group as well as a third user group. The subscribing, the executing, and the validating can each be performed by one or more processors and/or one or more computing devices. The subscribing, the executing, and the validating can each be performed by the same one or more processors or different one or more processors. In embodiments, a computer program product is embodied in a non-transitory computer readable medium for competitive arbitration, the computer program product comprising code which causes one or more processors to perform operations of: subscribing a first user group and a second user group to a digital competition arbitration platform that oversees a digital competition; executing a digital contract using a digital ledger token between the first user group and the second user group wherein the digital contract pertains to a result from the digital competition; and validating the result of the digital competition by collecting input from the first user group and the second user group as well as a third user group. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
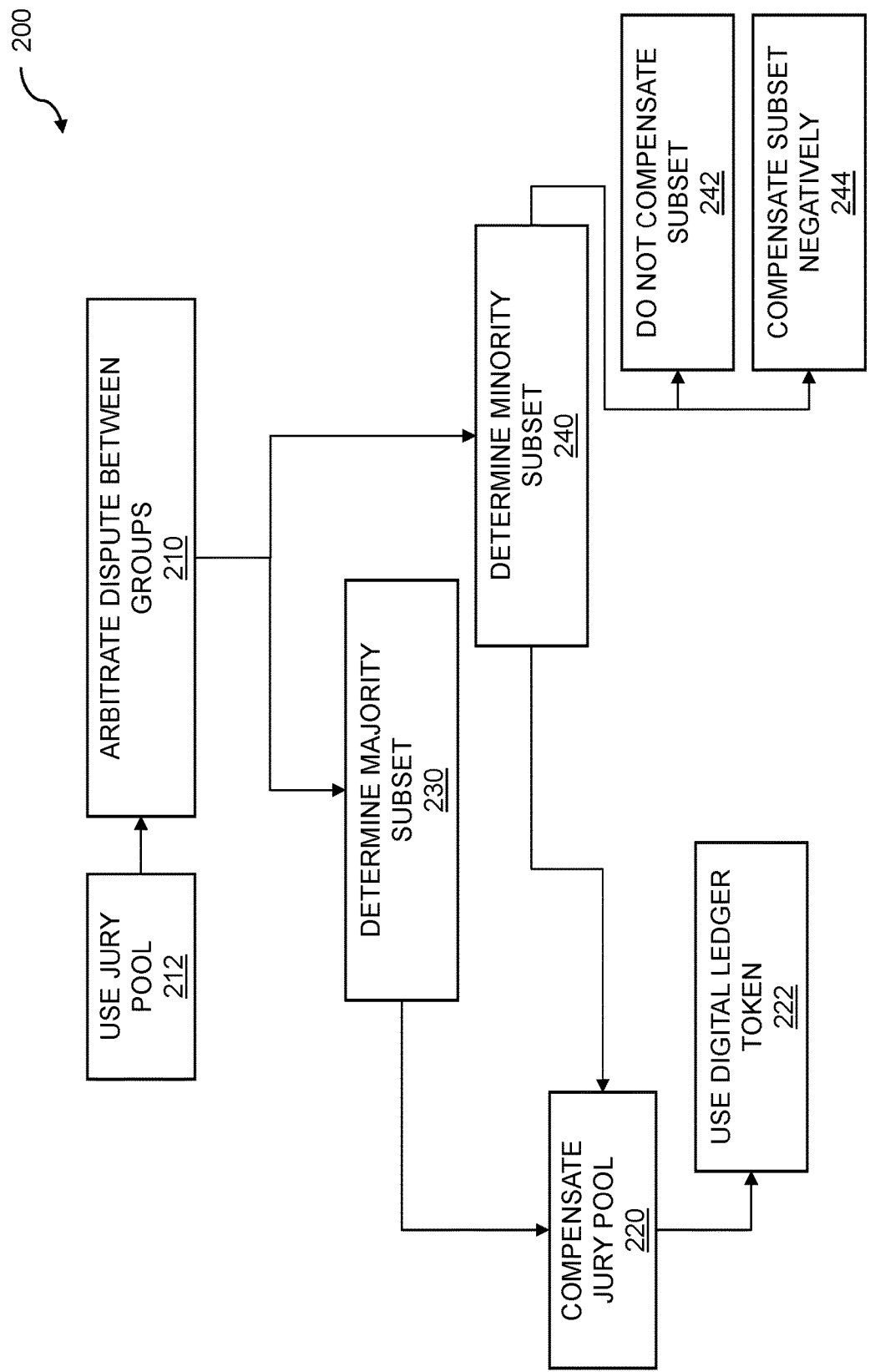
FIG. 2 is a flow diagram for compensation.

FIG. 2 is a flow diagram for compensation. The flow 200 includes arbitrating a dispute between groups 210. The arbitration can include using a jury pool 212. The jury pool can use online voting in an arbitration application to determine a majority and a minority. The number of jurors in the jury pool can be selected to be an odd number. The flow 200 can include determining a majority subset 230. The majority subset can comprise determining a first subset of the fourth user group that voted in a majority as part of the arbitrating. The flow 200 can include determining a minority subset 240. The minority subset can comprise determining a second subset of the fourth user group that voted in a minority as part of the arbitrating. The flow 200 can include compensating the majority jury pool 220. The compensation can include using a digital ledger token 222. The digital ledger token can comprise digital ledger currency. The flow 200 can include not providing compensation to a minority jury subset 242. The flow 200 can include negatively compensating a subset 244. Negative compensation can mean that a witness or jury pool member is in the minority and thus penalized for disagreement with the majority.

In embodiments, the first subset is compensated for the arbitrating. In other embodiments, the second subset is not compensated. In still other embodiments, the second subset is compensated negatively. Furthermore, in embodiments, compensation for the arbitrating is accomplished using the digital ledger token. The flow can include compensating the witnesses who validate the result. In embodiments, compensation for the validating is accomplished using the digital ledger currency. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
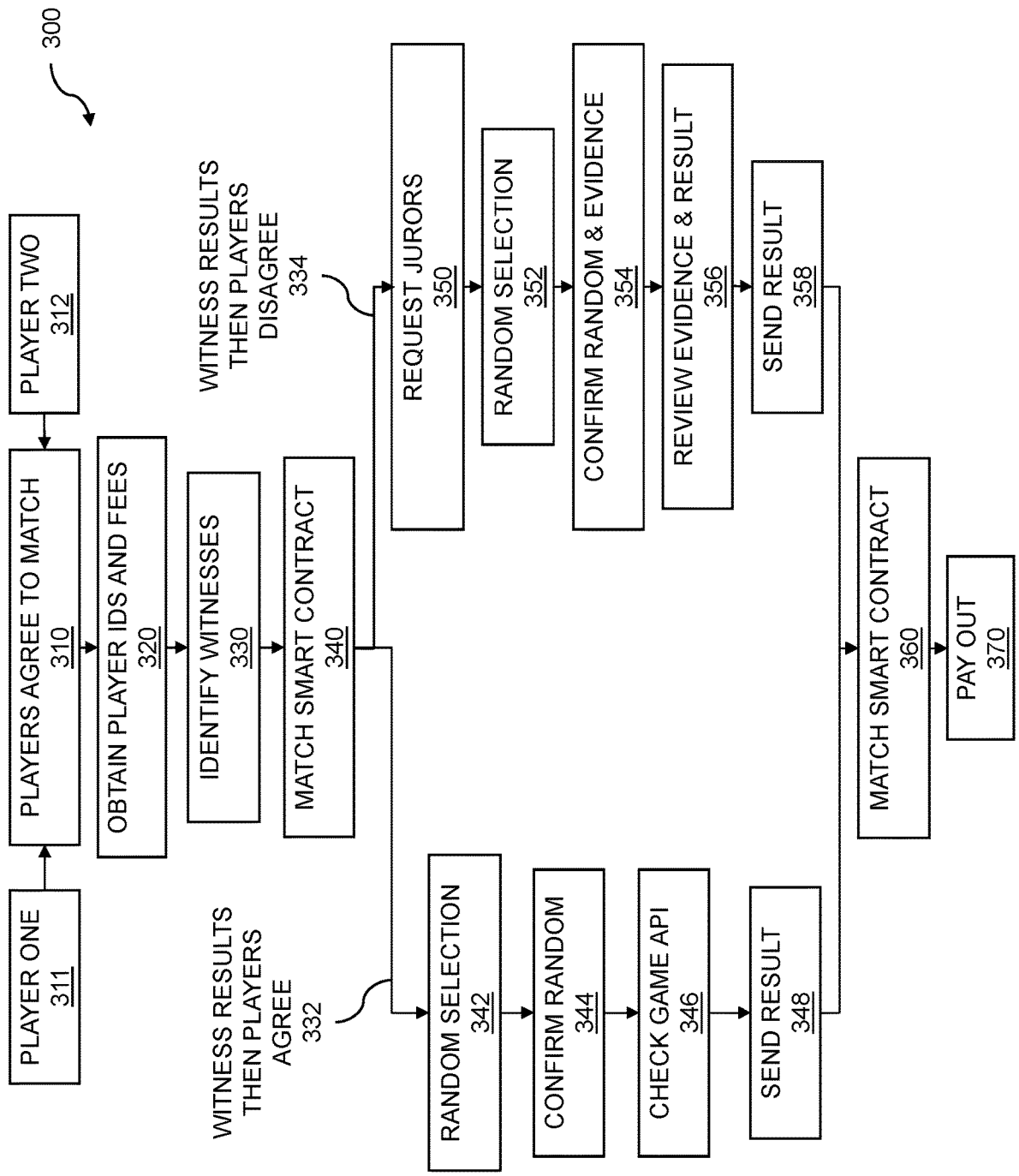
FIG. 3 is a flow diagram for witness node and jury pool arbitration.

FIG. 3 is a flow diagram for witness node and jury pool arbitration. The flow 300 includes players agreeing to a match 310. The match can be an eSports competition. The players can include Player One 311 and Player Two 312. Players One and Two can be individual users, groups of users, or a combination of both an individual user and a group of users. Player One 311 can comprise a first user group. Player Two 312 can comprise a second user group. The flow 300 includes obtaining player identifications (IDs) and fees 320. The IDs can uniquely identify the players in an online gaming environment. The fees can include match fees and match wagers, among other such fees. The flow 300 can include identifying witnesses 330. The witnesses can comprise the third user group. The witnesses can be identified using a weighted random selection process. A weighted random selection process is a random selection, but includes a statistical weighting such that, for example, a reliable witness is chosen more often than an unreliable witness. Reliability can be determined by timely reporting of witnessing a match. In embodiments, witnesses are identified before the smart contract, after the smart contract, before the competition, after the competition, and so on. In embodiments, the witnesses can be identified after the smart contract is agreed to so that witnesses can be familiar with what they are witnessing. In some embodiments, the witnesses can be identified after the digital competition is complete so that witnesses can be chosen based on competition result.

The flow 300 includes making a match smart contract 340. The smart contract can include matchmaking, which can match appropriate users for a digital competition match. For example, if two users have requests for engaging and wagering in a certain eSports competition, the smart contract can include matching competitors in the appropriate competition with the appropriate contract to validate and arbitrate the result. In embodiments, the smart contract handles matchmaking between the first user group and the second user group. The flow 300 can include the result being witnessed and then the players agreeing 332. The flow 300 can include the result being witnessed and then the players disagreeing 334. When the players agree with the witnesses, the flow 300 can include a random selection 342. The random selection 342 can be confirmed 344 and the game application programming interface (API) can be checked 346. The result can be sent 348 to the match smart contract 360. The smart contract can then oversee payout 370. Payout can be in the form of tokens and/or digital currency. When the players disagree with the witnesses, the flow 300 can include requesting jurors 350. The jurors can be selected randomly 352. The jury random selection can be confirmed and evidence can be presented 354. The evidence can be submitted by the players and can include screenshots of the game. The jurors can review the evidence and the match result 356. The result can be sent 358 to the match smart contract 360. The smart contract can then oversee payout 370. In embodiments, the smart contract handles reward settlement based on the result from the digital competition.

The digital competition arbitration platform that oversees a digital competition can be web-based or local device-based, such as on a desktop computer or even a mobile device such as a smartphone. The platform can manage smart contracts by means of tokens. A token can be used as stake in competitive eSports matches on the platform. The smart contract can handle the matchmaking and reward settlement after a match is processed by a decentralized result verification system. The decentralized result verification system is beneficial because it is resistant to game application programming interface (API) policy changes, fraud from subjective reporting, and certain criminal activities. All token holders can have the right to help determine match outcomes by witnessing matches and voting in a jury voting pool (JVP). A match result can either be contested or uncontested. A match is contested if the opponents disagree about the result of the match. A match is uncontested if the opponents agree about the result of the match. Whether a match is contested or uncontested, it needs to be confirmed by two or more witnesses.

A witness has a special role in the competitive arbitration platform and match verification system. In order to act as a witness, a token holder must run an automated witness node application. Witness nodes are, in effect, the curators of matches. Witnesses serve as the final gateway before matches and rewards are processed. The network of witness nodes acts as a decentralized proxy that has the ability to connect to game APIs and cross-reference game outcomes to ensure that no false, fraudulent, or suspicious matches are being processed by the platform. In order to be part of the pool of possible witnesses, token holders need to opt in by sending a transaction to the smart contract. For each match, one or more witness nodes are chosen by a weighted random selection process and are awarded additional tokens for their services. Specifically, the witness node application looks at each match assigned to it, checks game APIs for official results, and sends the result or results to a blockchain for all to see. The witness node application is completely automated; thus, people running a witness node do not need to intervene in any way.

A witness's probability of being selected can be proportional to his share of the total token supply that has been opted-in to a pool. In order to execute a random selection, the smart contract will provide a function that hashes a random seed provided by the platform, the user's address, and a match ID. The smart contract will use this hash to extract a random number between 0 and 1. The random number will then be scaled by a desired number of witnesses. Finally, the random number will be compared to the user's share of tokens. If the random number is less than a user's token share, then the user is selected as a witness. Running a witness node application brings game result data into the system and helps protect the reputation and integrity of the platform. Witnesses provide a valuable service and are compensated with a token. The potential incentive of running witness nodes grows linearly with the network as more matches are needed to be processed in a queue. Thus, witnesses have an incentive for the platform to succeed.

One of the perquisites of holding a token is the ability to receive compensation for fulfilling jury duty. In the event a match is contested, two or more witnesses will be required. Some members of the JVP will be randomly selected as members of the jury. In order to be considered a member of the JVP, token holders need to opt in by sending a transaction to the smart contract using a graphical user interface (GUI). All token holders are recommended to be opted in so they can be rewarded by the system and so that the platform can better handle high match volume. Jury members will be selected by the same weighted random selection processes used for witnesses. If a member of the JVP has been selected to sit on a jury, that juror can submit one vote to influence the outcome of the dispute. The juror's decision should be based on the result provided by the witnesses and any additional evidence or screenshots submitted by the players. The platform makes it easy for players to provide evidence of their result. Once the desired jury quorum has been reached, the winner will receive his match reward. For example, if one hundred people are selected in the JVP and the quorum is twenty, then twenty jurors must submit their vote before a case is considered resolved. A fraction of the reward will be paid to the witnesses and any jury members who voted with the majority. Members of the jury who voted with the minority might receive no reward or be penalized with a negative reward. Various steps in the flow 300 may be changed in order, repeated, omitted, or the like without departing from the disclosed concepts. Various embodiments of the flow 300 can be included in a computer program product embodied in a non-transitory computer readable medium that includes code executable by one or more processors.

Figure 4:
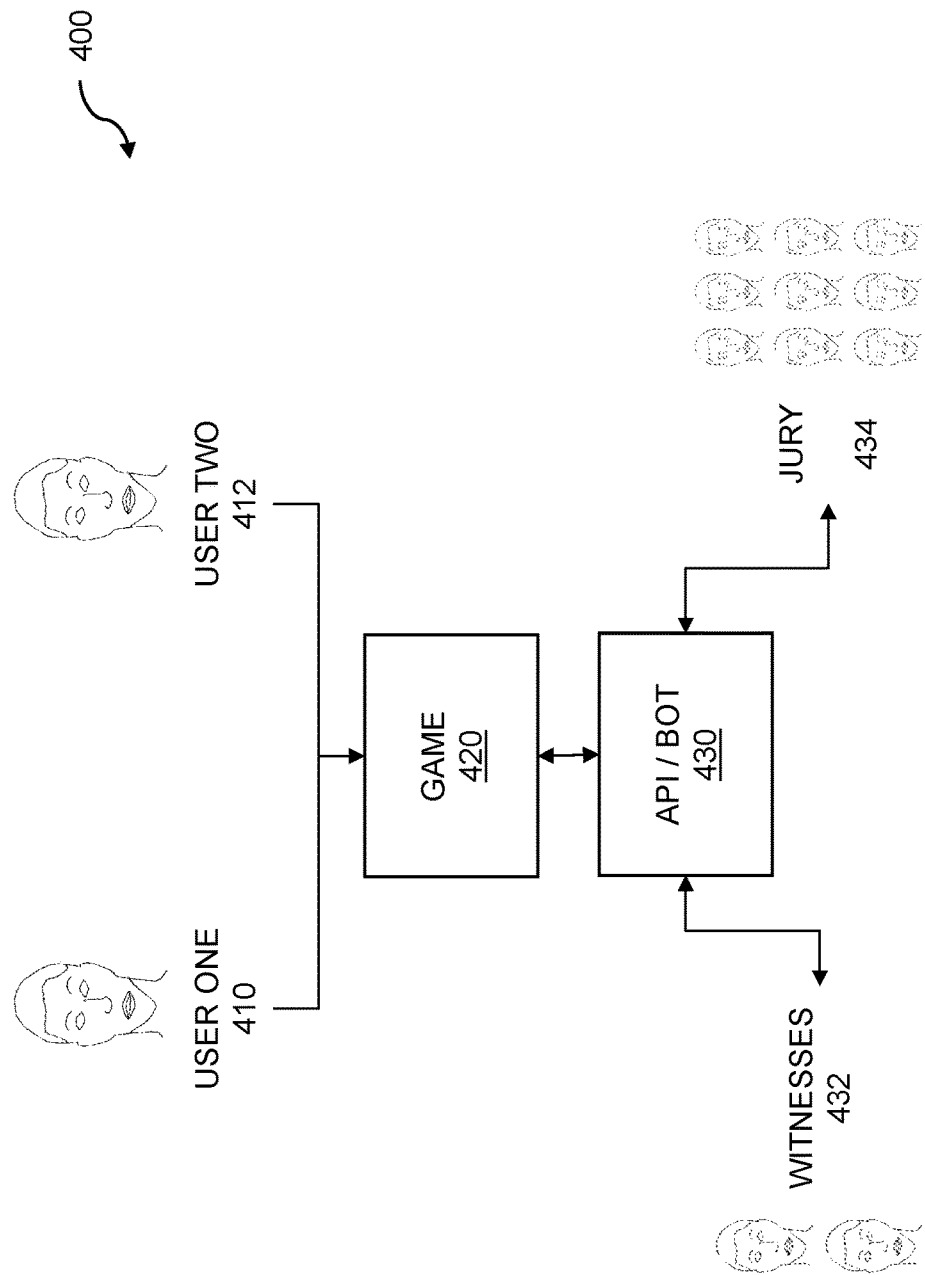
FIG. 4 is a system diagram for eSport interactions.

FIG. 4 is a system diagram for eSport interactions. The system 400 includes User One 410 and User Two 412 agreeing to participate in an eSport competitive digital game 420. Users One and Two can be individual users, groups of users, or a combination of both an individual user and a group of users. More than two users or groups of users can be included. The game 420 can include a result which indicates a winner of the eSport competition. The system 400 includes an API and/or bot 430 interfacing with the game 420. A bot, which is used herein, refers to an "internet robot", an application agent that can act on behalf of a user or a program. Perhaps the most common example of an internet bot is the so-called "web spider" agent that runs in the background to index internet web sites for search engines.

The system 400 includes one or more witnesses 432 interfacing with the API and/or bot 430. The system 400 includes one or more jury members 434 interfacing with the API and/or bot 430. The witnesses 432 can validate or certify a game 420 result. If User One 410 and User Two 412 agree with the result validation provided by the witnesses 432, the jury 434 might not have to interface with the API and/or bot 430. If User One 410 or User Two 412 disagrees with the result validation provided by the witnesses 432, the jury 434 might interface with the API and/or bot 430 by voting on the result based on the input of the witnesses 432 and any additional information, such as screenshots, provided by User One 410 and or User Two 412. The system 400 can include the use of a token to provide access to the system. A token can enable User One 410 and User Two 412 to participate in and be rewarded for an eSports interaction or game 420. A token can enable a person to be an eSports witness. A token can enable a person to be a member of a jury.

Figure 5:
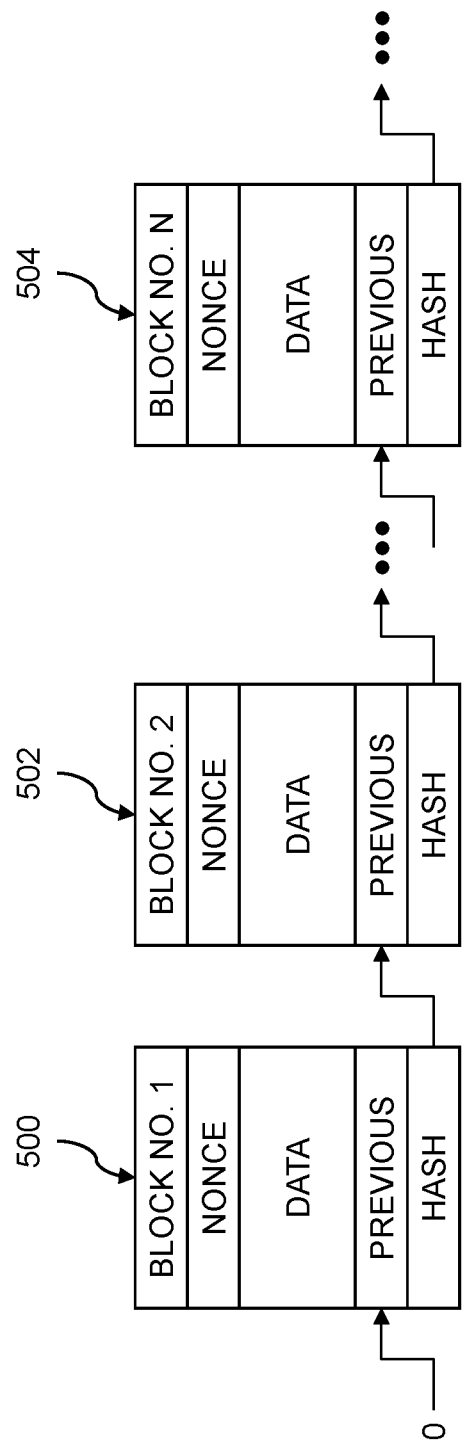
FIG. 5 illustrates a blockchain.

FIG. 5 illustrates a blockchain. Online transactions can be secured by using a blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

A blockchain can include two types of records. The blockchain records can include blocks and transactions. A block can include transactions, where the transactions have been determined to be valid. The blocks can be organized into a Merkle tree, which will be discussed in greater detail later. The Merkle tree can be formed based on hashing the transactions and on encoding the hashed transactions. A block in the blockchain includes a hash of the previous block in the blockchain. A blockchain can resemble a linked list in that the blocks of the chain are linked together. The notable difference between a linked list and a blockchain is that the reference to the previous block is not a pointer but instead a hash. Adding blocks to the blockchain is an iterative technique. The hash of the current block depends on the hash of the previous block, the hash of the previous block in the chain depends on the hash of the previous block to that block, and so on. A result of the iterative technique of the blockchain is that data stored in a blockchain can be considered secure. An example of security of data stored in a blockchain is digital currency. Since each block in a blockchain depends on hashes that are based on previous blocks in the blockchain, then a change of data in one block of the blockchain invalidates the hashes of all subsequent blocks in the blockchain. Digital currency can be spent once and cannot be infinitely reproduced and/or spent. That is, a transaction that shows that a particular unit of digital currency was used in an exchange creates a hash. If the unit of digital currency were to be used again, then the hash generated by the new transaction would invalidate all subsequent blocks in the blockchain, indicating that an attempt was made to reuse the unit of digital currency.

At times, validation can occur concurrently for separate blocks. The result of concurrent validation can be to create a fork, where the fork can remain temporarily. Recall that the blockchain is a distributed digital ledger that can be distributed widely across computer systems. The temporary fork can result in multiple histories of the blockchain since updates to the blockchain might not have completely disseminated across the distributed digital ledger. Algorithms, code segments, apps, applications, programs, etc. can be used to score the various versions of the history of the blockchain. Versions of history of the blockchain with the highest score can be chosen over versions of the history of the blockchain with lower scores. The lower scored versions of the history might not be selected for inclusion in the blockchain. These versions that are not selected for inclusion are called orphan blocks. Decisions about which histories of the blockchain score the highest are determined by peers in the distributed digital ledger. The peers use a particular algorithm, code segment, etc. to determine the scoring.

Updates to the blockchain are distributed across the peers. A peer can receive a version of the history of the blockchain with a higher score. The higher score can be due to a block being added to the blockchain. The peer can add the new block to the version of the blockchain stored by the peer, overwrite the existing version of the blockchain, etc. A new score can be determined. The peer can retransmit the improved blockchain to their peers.

In FIG. 5, a blockchain is shown. The blockchain includes blocks 500, 502, and 504. While three blocks are shown, in practice any number of blocks can be included in the blockchain. In practice, the number of blocks in the blockchain continues to increase. A block such as the block 500 includes a block number, a nonce, data, a hash received from the previous block, and a hash generated for this block. Since the block 1 500 is the first block in the blockchain, there is no previous block. For this first block of the blockchain, the hash from the previous block is zero. The nonce is a value that is a "onetime" value that is determined for the block. The nonce is a value that is determined based on the data, the previous hash, the hash for the current block, etc. If any information in the block were to be changed, such as information, the data, the previous hash, the block hash, etc., then the nonce value is no longer valid for the block. The nonce can be used to indicate that the block has been tampered with, corrupted, or otherwise changed. If there is a valid reason to change a value in the block, such as updating the data in the block, then a new nonce value is calculated. Determination of the new nonce value can be based on the hash for the block or other criteria. Subsequent blocks in the blockchain, such as the block 2 502 and the block N 504, contain fields similar to those fields of the first block 500. The previous hash value of the block 502 is set to the hash value of the block 500. The previous hash value of the block 504, block N, is set to the hash value for a block N−1 (not shown).

A change of value in one block of a blockchain causes the validity of all subsequent blocks to be negated. The invalidity of all subsequent blocks results from the hash of a given block being dependent on the hash of a previous block. That is, even though data in a given block such as the block 502 has not changed, the validity of the block 502 was based on the validity of its previous block, 500. If the data in the block 500 were to be changed, and the nonce not updated, then the block 502 is no longer valid since the hash for the block 500 changes. Since the validity of a given block depends on the validity of previous blocks, then the block 504 becomes invalid, and so on. By looking at any block in the blockchain, it can be determined whether the data in that block is valid. If the data in the block 500 were changed legitimately, then a new nonce value can be generated to revalidate the block 500. The result of regenerating the nonce value for the block 500 is that all subsequent blocks in the blockchain can remain valid.

Figure 6A:
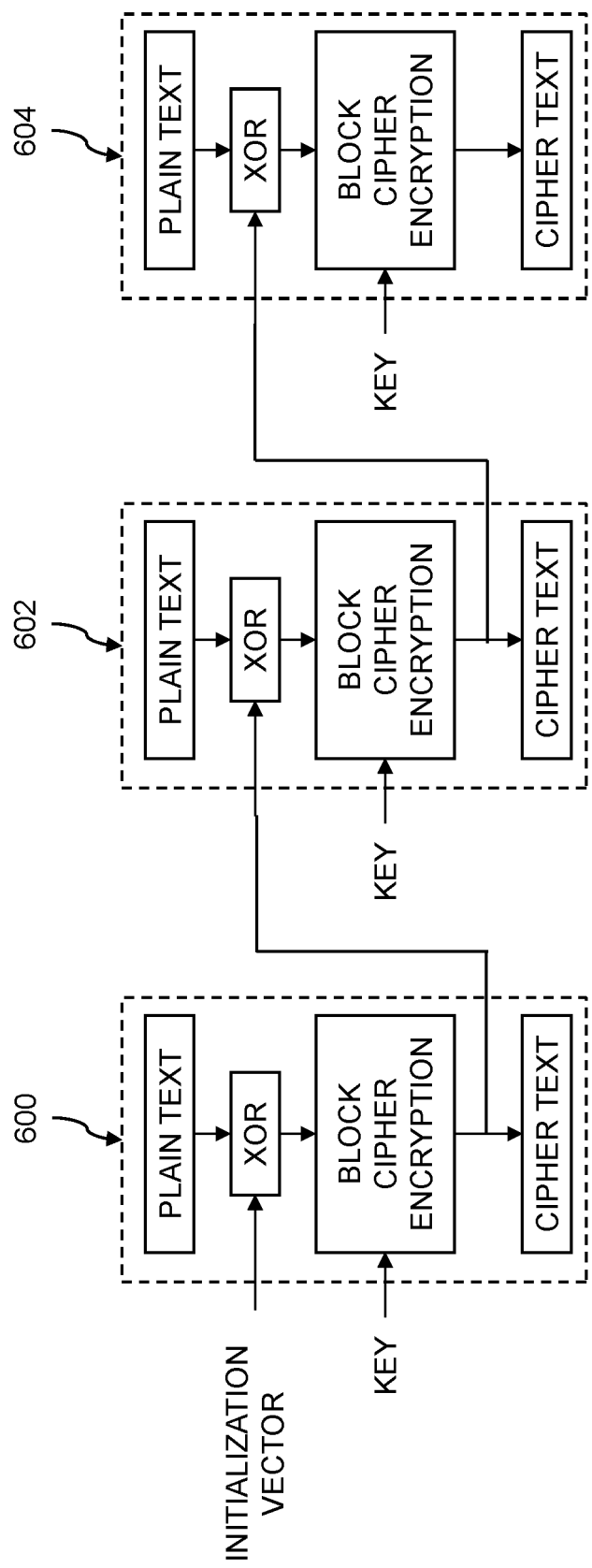
FIG. 6A shows cypher block chaining encryption.

FIG. 6A shows cypher block chaining encryption. Online transactions can be secured by using a blockchain. A blockchain is a distributed digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

The blockchain can be used to verify the authenticity of the data and other contents of the blocks within the blockchain. The usage of a blockchain can be supported by cryptographic techniques such as a block cipher mode. A block cipher can be based on a mode of operation, where a mode of operation can be an algorithm, a code segment, an app, an application, a program, etc. The block cipher operates on a block of information, where a block includes a fixed length number of bits. If the amount of information to be operated on by the block cipher does not fully fill a block, the block can be filled out by padding and other filling techniques. If the amount of information exceeds the size of a block, then the information can be partitioned into blocks until all of the information has been allocated to the one or more blocks.

The block cipher can be based on an initialization vector (IV), where the IV can be a unique sequence of binary bits. The IV can include characteristics such as being nonrepeating, random, etc. The IV can be used to encrypt text to generate cipher texts such that the resulting cipher texts are distinct from one another, even if the IV is repeatedly applied to the same plaintext, using the same key. The key can be a secret key. Returning to FIG. 6A, three blocks, 600, 602, and 604 are shown for a cipher block chain for encryption. A block for cipher block chaining encryption includes plaintext, a logical XOR, block cipher encryption, and cipher text. The block cipher encryption requires a key. For the first block (root) 600 in a blockchain, an initialization vector (IV) is routed to the XOR. In subsequent blocks, such as the blocks 602 and 604, the results of the block cipher encryption of the previous block can be routed to the XOR of a given block. The results of the block cipher encryption block of 600 can be routed to the XOR of 602; the results of the block cipher encryption block of 602 can be routed to the XOR of 604; and so on. The plaintext of a block, such as the block 600, is XORed with the IV. The results of the XOR are encrypted using a block cipher and a key to produce cipher text. For other blocks, such as the blocks 602 and 604, the plaintext of a block is XORed with the cipher text of the previous block. The results of the XOR are encrypted using a block cipher and a key to produce the cipher text for that block. The XORing and encrypting continue for as many blocks as are required for the data.

Figure 6B:
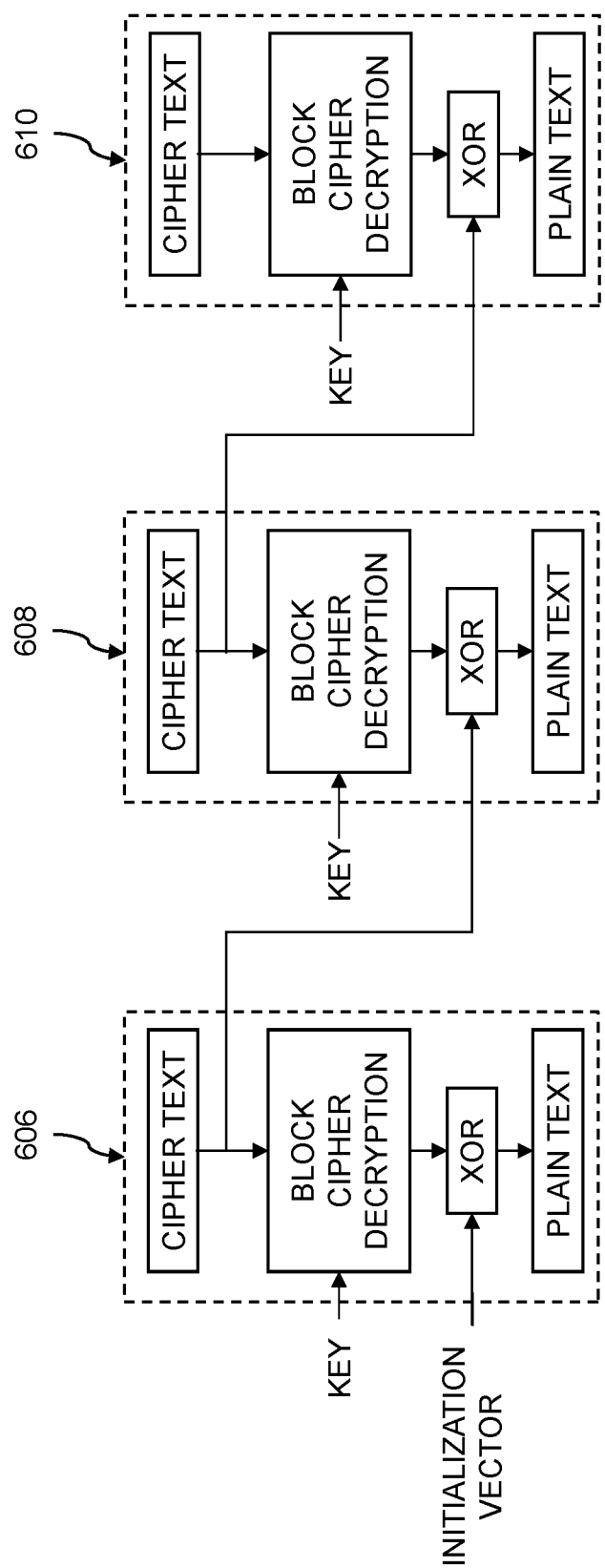
FIG. 6B shows cypher block chaining decryption.

FIG. 6B shows cypher block chaining decryption. Online transactions can be secured by using a blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

Three blocks, 606, 608, and 610, are shown for cipher block chaining decryption. A block, such as any of 606, 608, or 610, for cipher block chaining decryption includes cipher text, block cipher decryption, an XOR, and plain text. The block cipher decryption is based on a key. The input to the XOR is an initialization vector (IV) for the first or root block 606. As for encryption, the inputs to XORs of subsequent blocks such as the blocks 608 and 610 are based on the cipher texts of the previous blocks. The cipher text of the block cipher decryption block 606 can be routed to the XOR of the block 608; the cipher text of the block 608 can be routed to the XOR of the block 610, and so on. The decrypting and XORing can continue for blocks of the blockchain.

Figure 7:
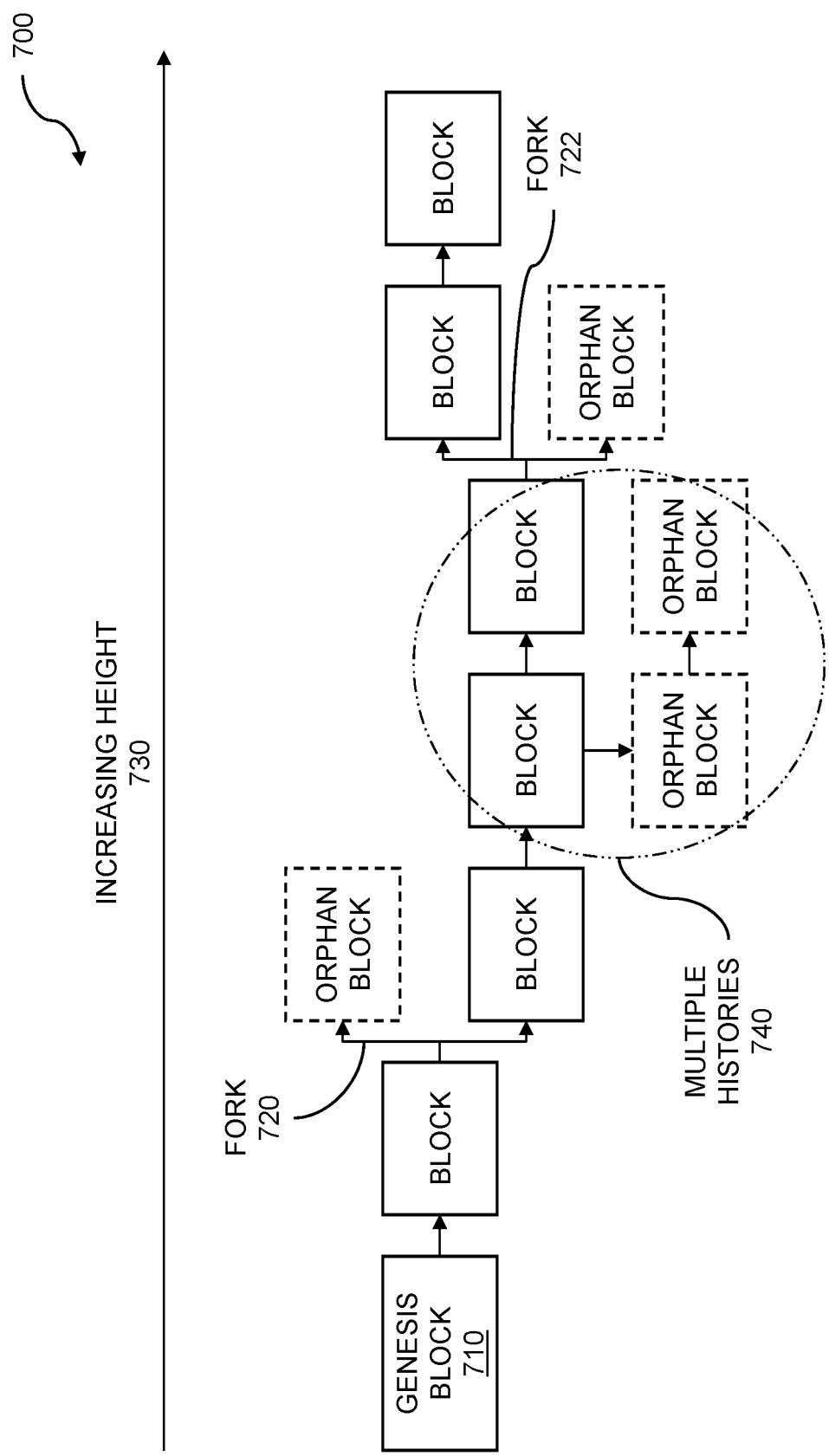
FIG. 7 illustrates formation of a blockchain over time.

FIG. 7 illustrates formation of a blockchain over time. Online transactions can be secured by using a blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., without detection after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

The illustration 700 shows a blockchain including a genesis block 710 that forms the root of a blockchain. Blocks can be added to the blockchain over time. The addition of blocks can be described as increasing the height 730 of the blockchain. Addition of a new block to the blockchain can be based on validation. Recall that the blockchain is a distributed digital ledger. At times, validation can occur concurrently for separate blocks. The result of concurrent validation can be to create a fork such as a first fork 720 and a second fork 722, where the fork can remain temporarily. The temporary fork can result in multiple histories of the blockchain, such as multiple histories 740. The multiple histories can occur since updates to the blockchain might not have completely disseminated across the distributed digital ledger. The various versions of the histories of the blockchain are scored, as described elsewhere. The versions of history of the blockchain that score the highest can be chosen over versions of the history of the blockchain with lower scores. The lower scored versions of the history might not be selected for inclusion in the blockchain and are orphaned, as show in the illustration 700 by the orphan blocks. Decisions about which histories of the blockchain score the highest are determined by peers in the distributed digital ledger. Updates to the blockchain are distributed across the peers. A peer can receive a version of the history of the blockchain with a higher score. The higher score can be due to a block being added to the blockchain. The peer can add the new block to the version of the blockchain stored by the peer, overwrite the existing version of the blockchain, etc. A new score can be determined. The peer can retransmit the improved blockchain to their peers.

Figure 8:
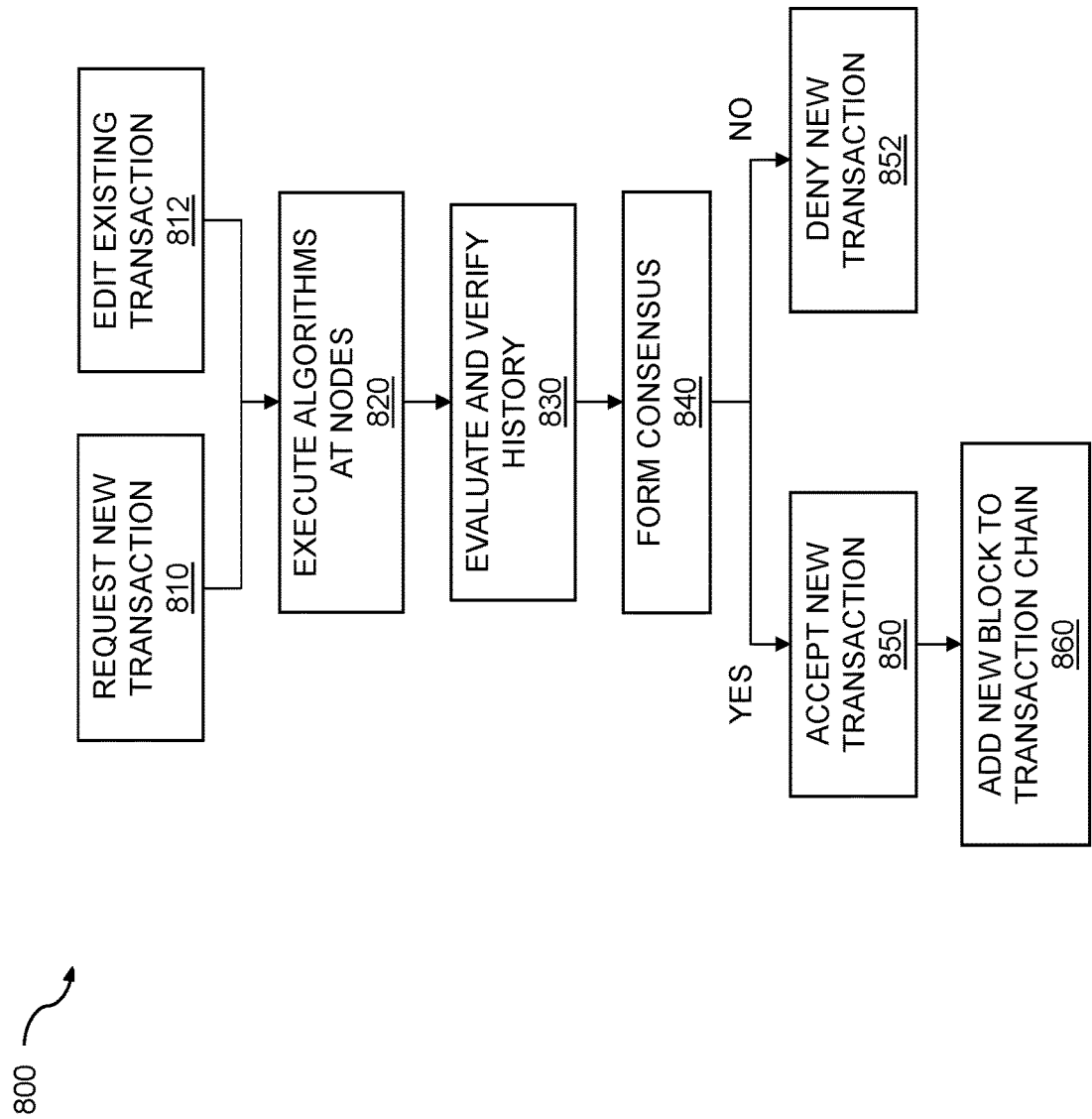
FIG. 8 is a flow diagram for transaction handling.

FIG. 8 is a flow diagram for transaction handling. Online transactions can be secured by using a blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

To support the use of a blockchain for transactions such as financial transactions, a layer can be built on top of the blockchain. One such layer is the Omni™ Layer. The Omni™ layer includes a protocol for digital currency and communications that supports cryptocurrency transactions. The Omni™ layer can be built on the Bitcoin™ blockchain. The Omni™ layer can support financial transactions, including complex financial transitions on a cryptocurrency. The transactions can include building custom currencies and assets, crowdfunding, peer-to-peer asset trades, etc. A cryptocurrency can include Bitcoin™, Ethereum™, and so on. The complex financial transactions can include sending a cryptocurrency payment, receiving a cryptocurrency payment, transferring a cryptocurrency, auditing a transaction, and so on. The payments, receipts, transfers, etc., can be made with respect to a cryptocurrency address. The cryptocurrency address can be generated by selecting a random private key and generating a corresponding cryptocurrency address. Fees can be associated with the financial transactions and can be paid in the cryptocurrency of choice. Another example of a layer that helps support transactions using a cryptocurrency is Ethereum™ Casper™. Cryptocurrencies can run using a technique called "proof-of-work" (PoW). In a proof-of-work technique, users, called "miners", solve one or more cryptographic puzzles to add to or "mine" a blockchain. Casper™ can use a "proof-of-stake" (PoS) technique. Proof-of-stake techniques can include consensus algorithms that can be applied to public blockchains. In a proof-of-stake technique, validators can by turns propose and vote in a next blockchain. The vote of each validator can have a weight, where the weight can be based on the financial stake of the validator. The financial stake of a validator can be based on a deposit or "stake".

Cryptocurrencies such as Bitcoin™, Ethereum™, and so on, can be purchased and sold. As such, the value of a cryptocurrency can be based on classic market forces such as supply and demand. Given a supply of cryptocurrency units or "coins", when demand increases, the price to purchase a unit of the cryptocurrency can also increase. When demand wanes and there is an oversupply of the cryptocurrency units, the price to purchase a unit of the cryptocurrency can also fall. Another technique is to issue units of a cryptocurrency based on deposited funds, where the deposited funds often can be based on a fiat currency. That is, a customer wishing to purchase units of a cryptocurrency can deposit United States dollars, British pounds, European Union euros, Chinese yuan, etc., and can be issued a number of cryptocurrency tokens. When the issuer of the cryptocurrency tokens exchanges only one currency, other currencies first can be converted to the one currency before cryptocurrency tokens are issued, such as converting euros to dollars. A token issuing entity can hold United States dollars in a bank account and can issue tokens based on the deposited funds. Tether™ tokens use a blockchain as a ledger and are able to move tokens among users for purchases, sales, funds transfers, and so on. Tether™ tokens can be issued on Bitcoin™ and Ethereum™. DollarToken™ can use a smart contract to control the movement of tokens among purchasers, sellers, funders, e-gamers, and so on. When a United States dollar is deposited in a bank account, DollarToken™ tokens can be issued to the user. The more dollars deposited, the more DollarToken™ tokens can be issued.

Returning to the figure, the flow 800 includes requesting a new transaction 810. A new transaction can include starting a new blockchain where the new transaction can represent the first or root block of the blockchain. The new transaction can include adding a transaction to an existing block chain. The new transaction can include adding a new block to the blockchain based on a time, such as adding a block every five minutes, for example. The new transaction can include receiving an updated block chain from a peer in a distributed digital ledger. The flow 800 includes editing an existing transaction 812. A block in the blockchain can be edited for a variety of purposes such as updating, modifying, correcting, or otherwise changing the contents of a block. A block in the blockchain could be updated to correct a data corruption event. As discussed elsewhere, editing a transaction, data, a block, etc., can require determining a new nonce value for the block that is to be edited.

The flow 800 includes executing algorithms at nodes 820. An algorithm, code segment, app, application, program, etc., can be executed at a node based on a request for a new transaction. The algorithm, code segment, etc., can be used to process data as part of a cipher chain. The flow 800 includes evaluating and verifying a history 830 of a blockchain. Recalling the discussion of a blockchain and its formation, it may be noted that a block in the blockchain includes a label or number, a nonce, data, a previous hash, and a hash generated for the current block based on the other block information. Since the hash for a block in the blockchain is computed based on the hash from the previous block, the determination of the hash for the current block is iterative. One unauthorized change in a block which occurs earlier in a blockchain invalidates not only the block in which the unauthorized change was made but also all subsequent blocks. Evaluation and verification of the history of a block can ensure the veracity of the block, the blockchain, etc.

The flow 800 includes forming a consensus 840. Each node that is included in a distributed digital ledger includes a copy of the blockchain. The nodes can be distributed geographically. Each node, having evaluated and verified the history of its copy of the blockchain, forms a score for a request for a new transaction. The nodes collaborate to form a consensus on whether or not to allow the transaction. The collaboration among nodes can include collective self-interest. The collaboration among the nodes can support high confidence in data security, integrity, and so on. If the consensus formed from the evaluation and verification by the nodes is "no", then the new transaction is denied 852. If the consensus formed from the evaluation and verification by the nodes is "yes", then the new transaction is accepted 850. The flow 800 includes adding a new block to the transaction chain 860. Adding a new block to the transaction chain includes obtaining the hash from the previous block; obtaining the transaction, data, etc. for the new block, and generating a hash for the current (new) block. The new block can then be added to the blockchain. As described elsewhere, the addition of the new block can be distributed to the peers that are included in the distributed digital ledger. The new block can be added to the blockchains at the peers, the updated blockchain can overwrite the blockchain existing at the peers, etc. Various steps in the flow 800 may be changed in order, repeated, omitted, or the like without departing from the disclosed concepts. Various embodiments of the flow 800 can be included in a computer program product embodied in a non-transitory computer readable medium that includes code executable by one or more processors.

Figure 9:
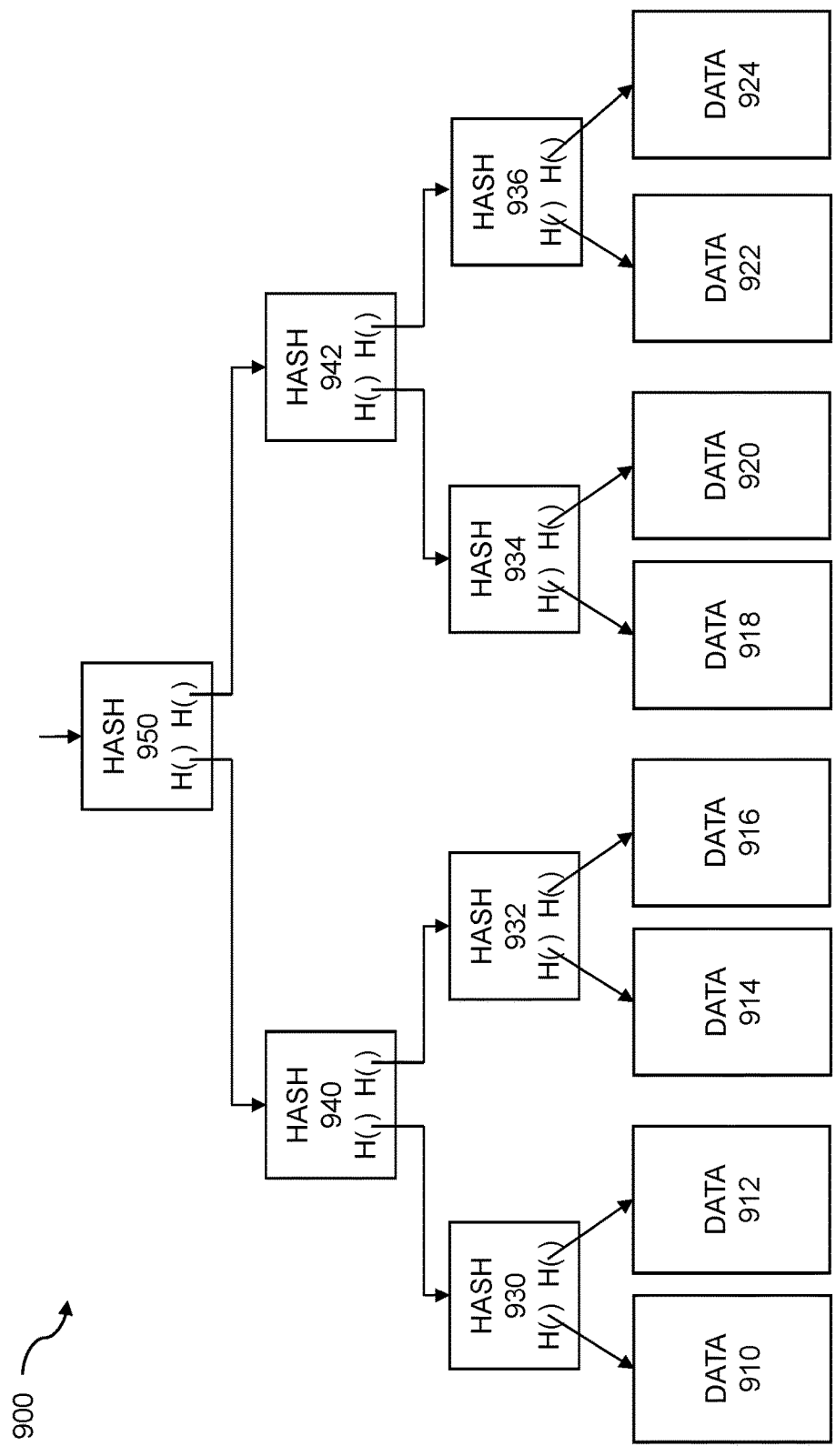
FIG. 9 illustrates a Merkle tree.

FIG. 9 illustrates a Merkle tree. Online transactions can be secured by using a blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

A Merkle tree is based on a hash tree where the hash tree can be a binary tree. The Merkle tree includes nodes, where the nodes include leaf nodes that can contain data, intermediate nodes, a root node, and so on. Nodes within the Merkle tree can be labeled. The labels of the nodes can be based on hashing. The label of a given node can include the hash of the labels of the child nodes of the given node. The label that is assigned to the parent node of given leaf nodes can include a hash of the contents, values, etc., contained within the leaf nodes. The hashes that are generated and are used as labels for the nodes of the Merkle tree can support verification of the data stored in the leaf nodes. The verification of the data stored in the leaf nodes can include secure techniques.

An illustration of a Merkle tree 900 is shown. The Merkle tree 900 includes leaf nodes 910, 912, 914, 916, 918, 920, 922, and 924. The leaf nodes can be hashed, where the hash technique can be based on taking data of any size and mapping that data to data of fixed size. The hash that can be generated by the hash technique can support rapid data searches, cryptography, etc. For a Merkle tree that can include a binary tree, the leaf nodes can be grouped in pairs. The hashes that are generated for each node in the pair can be used to form node labels including hashes 930, 932, 934, and 936. The labels can be based on concatenating the hashes from the leaf nodes. The hash 930 can be based on concatenating hashes for data in leaf nodes 910 and 912; the hash 932 can be based on concatenating hashes for data in leaf nodes 914 and 916; the hash 934 can be based on concatenating hashes for data in leaf nodes 918 and 920; and the hash 936 can be based on concatenating hashes for data in leaf nodes 922 and 924. Forming labels for parent nodes can include hashing and concatenating labels of intermediate (child) nodes. A label for a parent node 940 can be determined by concatenating the hash of the child node hash 930 and the hash of the child node hash 932; and the hash for parent node 942 can be determined by concatenating the hash of the child node hash 934 and the hash of the child node hash 936. The steps of hashing labels and concatenating hashes can be repeated. The label for a hash 950 can be determined by concatenating the hash of the node hash 940 and the hash of the node hash 942. Since there are no other pairs of child nodes, then the hash 950 can be a root node.

Figure 10:
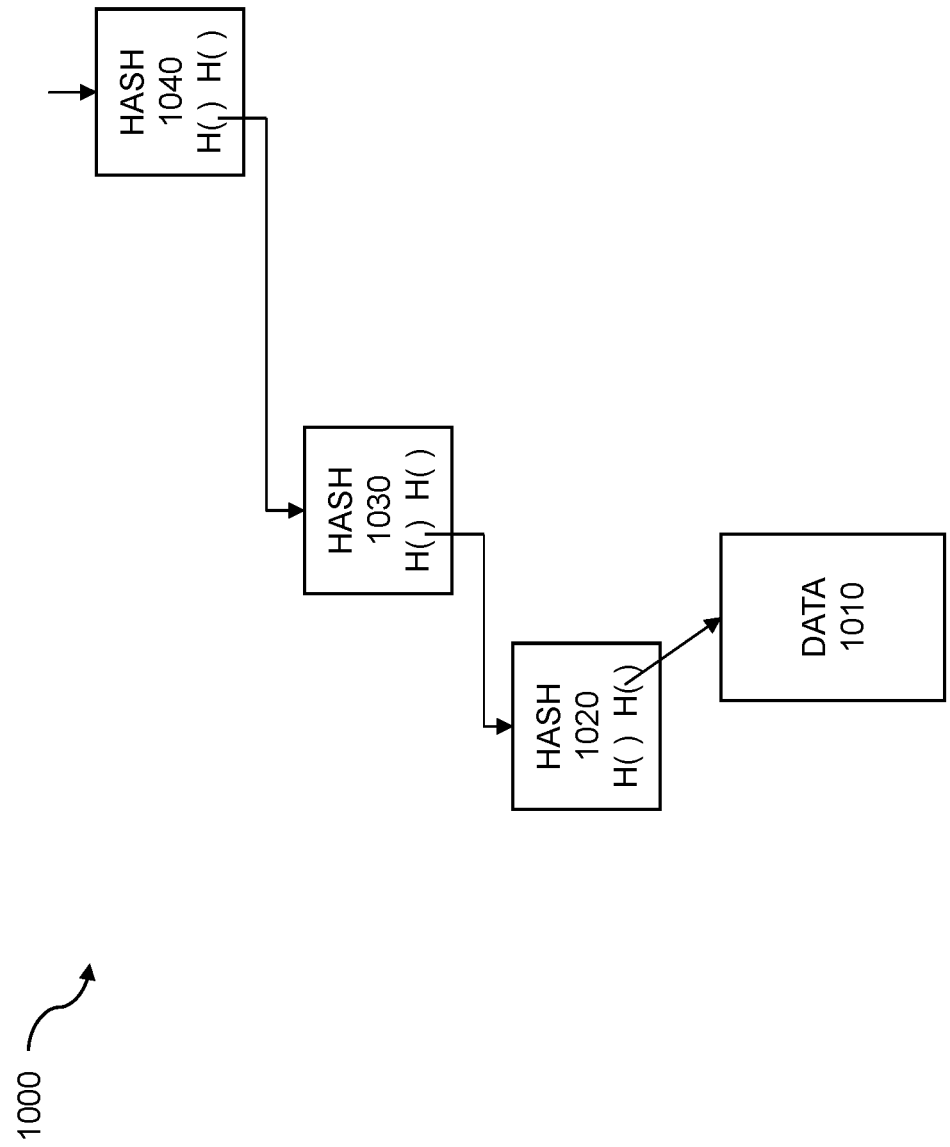
FIG. 10 shows proof of membership.

FIG. 10 shows proof of membership. Online transactions can be secured by using a blockchain. A blockchain is a digital ledger that supports the recording of digital transactions such as online transactions. The blockchain records the online transactions as a decentralized digital ledger. The digital ledger is widely distributed, where the wide distribution can include global distribution. The registered transactions are hashed and stored such that the transactions cannot be altered, modified, changed, corrupted, tampered with, etc., after the transactions have been recorded, thus securing the registered transactions. Veracity of a registered transaction is authenticated based on collaboration among systems that support the decentralized digital ledger. The authentication is based on verifying a hashchain for the transaction. The blockchain is based on a hashchain within a hashchain.

The Merkle tree described in FIG. 9 is based on a hash tree, where the hash tree can be a binary tree. Nodes within the Merkle tree are labeled, where the label of a parent node can be based on a concatenation of the hashes of the labels (intermediate node) or data (leaf node) of the child nodes. Since each node can include the hashes of its child nodes, the question of whether a given node is indeed a member of the Merkle tree can be determined concisely. A subset of a Merkle tree 1000 is shown. A data block 1010 at a leaf of the Merkle tree 1000 can be a possible member of the Merkle tree. To confirm whether the leaf containing data block 1010 can be a member of the Merkle tree 1000, the root block 1040, the data block 1010, and any blocks along the path between the root block 1040 and the data block 1010 can be indicated. The blocks along the path between root block 1040 and data block 1010 include blocks 1030 and 1020. The portion of the label of the parent node that refers to the hash of the child node of interest can be extracted from the label of the parent node. Each hash that is encountered along the path from the root block 1040 to the leaf node (data block 1010) can be verified. The hashes along the path (blocks 1040, 1030, 1020, and 1010) are considered to be verified if the hashes that are calculated match the hashed labels. Verification of the hashes confirms membership of data block 1010 in the Merkle tree 1000.

Figure 11:
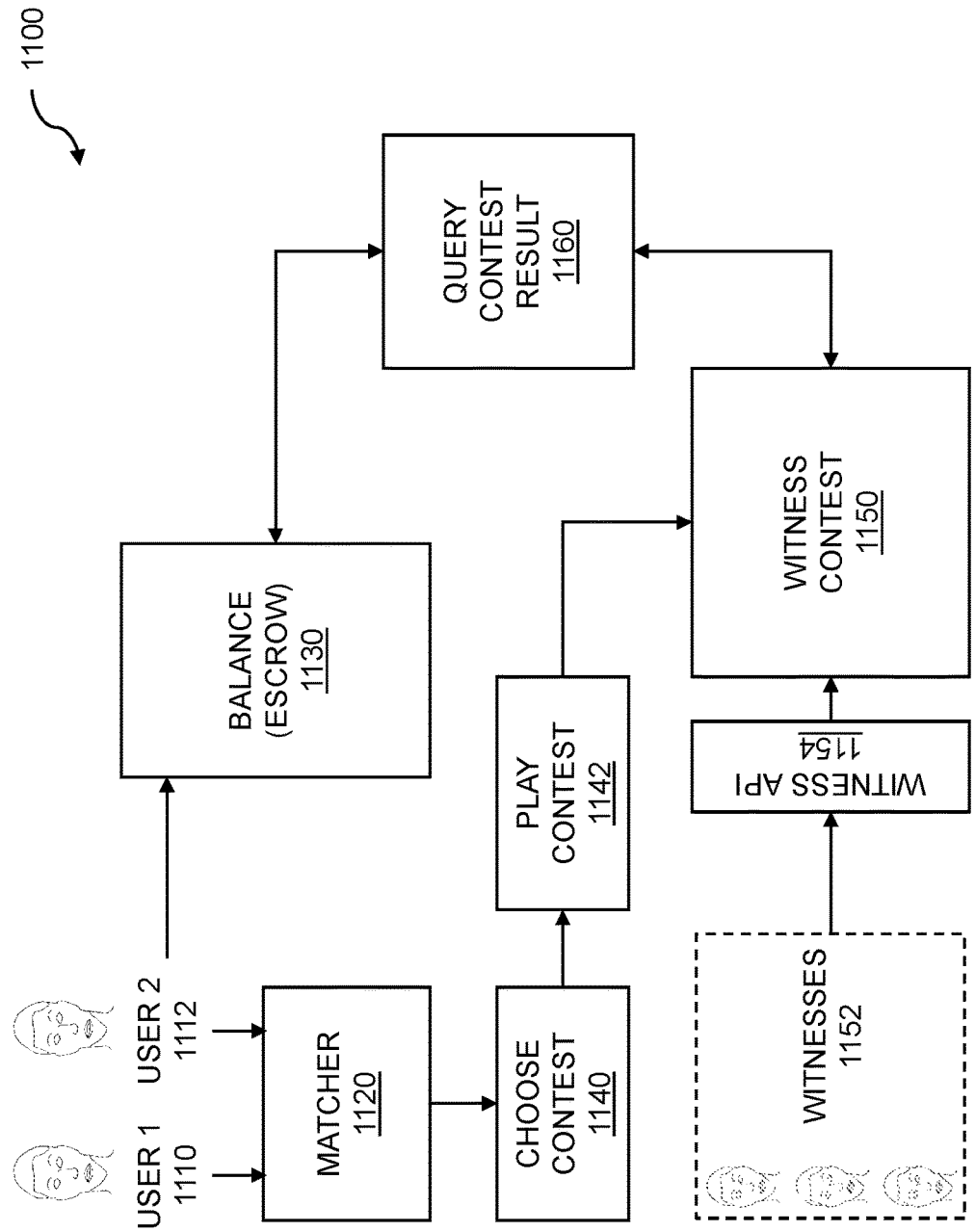
FIG. 11 is a block diagram illustrating match resolution.

FIG. 11 is a block diagram illustrating match resolution. Contestants can compete against each other in a variety of online contests such as eSports, multiplayer and strategy games, competitions, and so on. When no funds are transferred from the loser to the winner, the winner of a contest may be determined amicably by the contestants in a spirit of mutual agreement. In the event that the contestants disagree, or there is a wager involved, or verification is required for payout, or in other cases that require input from a third party, a cadre of witnesses to the contest can be polled to verify the winner. The witnesses can be distributed widely across the Internet. The witness-based verification of the contest winner supports decentralized competitive arbitration using digital ledgering.

The eSports, multiplayer games, strategy games, persistent world games, or other online competitions can be played in a variety of ways, including individual play, team play, cooperative play, strategic play, in-game purchase play, and so on. The techniques by which individuals participate in the contests or competitions can include participation as individual players, teams of players, or alliances of players. The contests between individuals can be entered as described above. An individual can pay a fee, place a wager, transfer funds or tokens into an escrow account, agree to compete, and the like. Similarly, players can form teams prior to entering a contest, forming in-game teams and alliances. Whether playing as individuals or as teams, the contestants vie to win real-time strategy games, battle games, first-person shooter games, or fighting games that can include battle fields, boxing rings, or mixed martial arts cages. The fees, wagers, or prizes can be transferred to the winner or winners, based on witness-based verification. When the contestants agree on which individual or team is the winner, or jurors confirm a winner, then the transfer can take place.

In one usage scenario where the contestants compete, the game or competition can include two or more individuals or teams playing between and among each other to determine an overall winner. Such games or competitions can include a winner-take-all victory, a round-robin tournament, a "bataille royale" (battle royal) contest, massively multiplayer online game (MMOG or MMO) competition, persistent play games which can be exited and re-entered, and so on. In this scenario, individuals or teams enter to complete by paying a fee, placing a wager, transferring funds/tokens. The games or completions can include a plurality of players such as tens, hundreds, or more players, who can compete individually or as teams. The completion can include one-on-one games, contests, battles, etc.; heats or preliminary rounds; a tournament tree; qualifying rounds; and the like. The game or completion can include quarterfinal rounds, semifinal rounds, a final round, and so on. The game or competition can include solving puzzles, earning points by finding treasure, etc. The game or competition can continue as some of the participants or teams are defeated, cut, disqualified, retired, or are otherwise removed from the game or competition. The end of the game or competition can be determined by an overall winner. The winner can be the individual or team that has amassed the most points, won the most battles, solved the most puzzles, located the most treasure, and so on. The winner can be the "last person standing", last team participating, etc. The overall winner can be determined by agreement by the participants, or when no agreement can be reached, by decision of the jury. The winner can be awarded money or tokens, a prize, or the like. Money or tokens can be transferred to the winning individual or team. In embodiments, prizes, winnings, etc., can be awarded based on a ranking of finishers of the game or competition. A ranked finish can include first place, second place, third place, runner up, a consolation prize, and so on. In some cases, the first user group and the second user group are part of a multiplicity of user groups involved in the digital competition. In embodiments, the multiplicity of user groups compete in a round-robin type competition. In some embodiments, the multiplicity of user groups are matched by an arbitration server.

An example block diagram 1100 for match resolution is shown. Contestants such as user 1 1110 and user 2 1112 can register to compete in online competitions. While two users are shown, tens, hundreds, thousands, etc., of contestants can register for online competitions. The registration can include information such as contact information, an online persona, competition preferences, payment details, digital wallet address, and so on. The online competitions can be "friendly" contests, where points or other indications of victories can be recorded, competitions which pay out prizes, wager-based competitions, etc. A matcher 1120 can match users who have registered to compete in online competitions. The matcher can serve as a "matchmaker" that identifies users with similar interests, rankings, abilities, histories, or other parameters that can be identified and ranked. When contestants such as user 1 and user 2 are matched, they can agree to compete. Entry into the competition can require payment of a fee, an ante to a kitty, a wager, and so on. The payment can be added to a balance and held in escrow 1130. The escrow can act as a bank that holds the fees, antes, wagers, etc. Tokens such as Tether™, DollarFirst™, etc., can be issued based on the funds held in escrow. The contestants can choose a contest 1140. The contest can include an online competition such as a battling game, a head-to-head competition, skills-based contests, eSports, and so on.

The contestants can compete by playing the agreed upon contest 1142. The players compete until one is victorious over the other by defeating the other player, finding more treasure, earning more points, taking less time to complete a task, or some other basis for determining a winner of the contest. The players can agree as to which player is the victor or can request arbitration. Arbitration can be required when a prize, winnings, etc., are to be paid out, irrespective of whether or not the contestants agree on the victor. The arbitration can verify the outcome of the contest. Arbitration can include decentralized competition arbitration, where a plurality of witnesses is polled. The winner of the contest can be the contestant selected as the winner by a majority of the witnesses. The witnesses 1152 witness the competition 1150. The witnesses can register as decentralized competition arbitrators. The witnesses can be verified and vetted using "know your customer" (KYC) techniques. The KYC techniques can include verifying witness identity, ensuring there are no conflicts of interest, and so on. Once registered, the registered witnesses can access and witness the contest through a witness application programming interface (API), shown as witness API 1154. The witnesses use the API to witness the competition and to register their respective votes. The witnesses can receive remuneration for their services as witnesses, which demonstrates the need to register and verify the witnesses. In addition to voting for the winner of a contest, the vote of the witnesses can also serve to verify the outcome of a contest between and among users. When a prize is to be awarded, wagers or a "kitty" paid out, and so on, a query of the contest result 1160 can be initiated. The result of the query can be verification of which contestant is the winner of the contest. When the winner has been verified, the balance held in escrow 1130 can be paid out to the winner such as user 1, user 2, etc.

Figure 12:
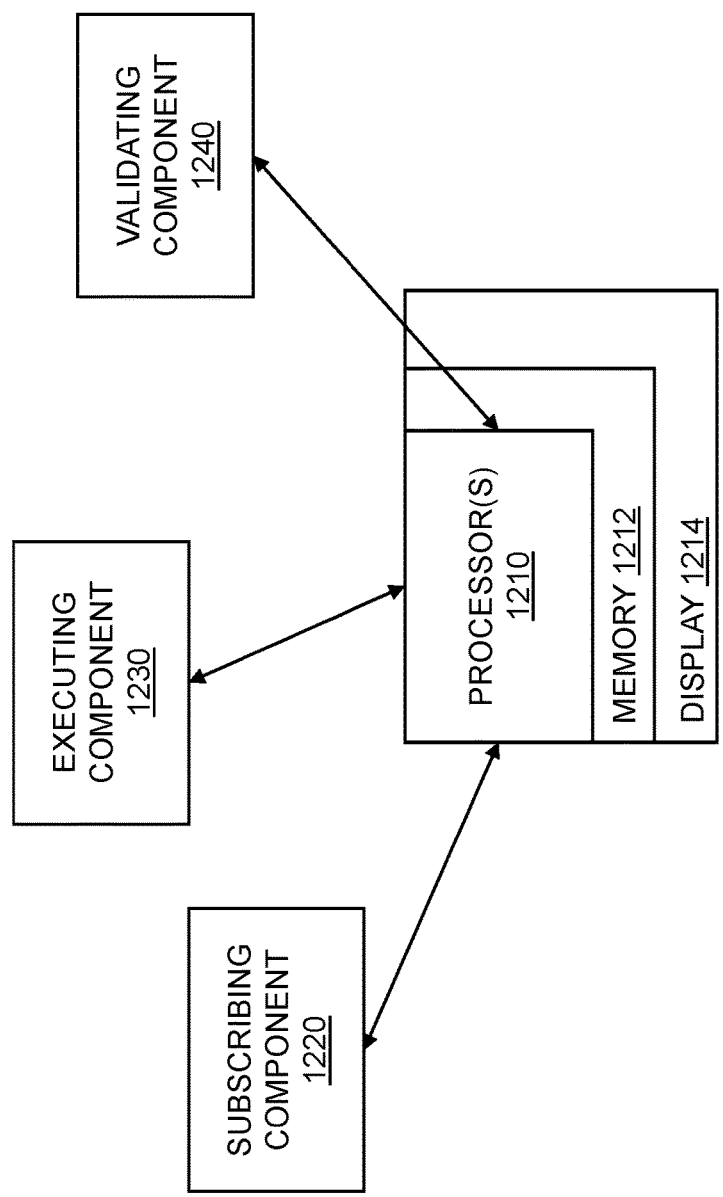
FIG. 12 is a system diagram for competitive arbitration.

FIG. 12 is a system diagram for competitive arbitration. A system 1200 can include one or more processors 1210 connected to a memory 1212 and a display 1214. The system 1200 can include a subscribing component 1220, an executing component 1230, and a validating component 1240. The system 1200 can comprise a decentralized digital competition arbitration platform. The subscribing component 1220 can comprise subscribing a first user group and a second user group to a digital competition arbitration platform that oversees a digital competition. The digital competition arbitration platform can comprise a token-based, digital smart contract. The digital competition arbitration platform can comprise a decentralized result verification system. The executing component 1230 can comprise executing a digital contract using a digital ledger token between the first user group and the second user group. The digital contract can pertain to a result from the digital competition. The validating component 1240 can comprise validating the result of the digital competition by collecting input from the first user group, the second user group, and a third user group. The third user group can comprise one of more witness users. A fourth user group can comprise a jury pool. The validating component 1240 can comprise a network of witness user nodes that act as a decentralized proxy for connecting to a digital competition API or APIs and for cross-referencing competition results.

Disclosed embodiments include a computer system for competitive arbitration comprising: a memory which stores instructions; one or more processors attached to the memory wherein the one or more processors, when executing the instructions which are stored, are configured to: subscribe a first user group and a second user group to a digital competition arbitration platform that oversees a digital competition; execute a digital contract using a digital ledger token between the first user group and the second user group wherein the digital contract pertains to a result from the digital competition; and validate the result of the digital competition by collecting input from the first user group, the second user group, and a third user group.

Disclosed embodiments include a computer program product embodied in a non-transitory computer readable medium for competitive arbitration, the computer program product comprising code which causes one or more processors to perform operations of: subscribing a first user group and a second user group to a digital competition arbitration platform that oversees a digital competition; executing a digital contract using a digital ledger token between the first user group and the second user group wherein the digital contract pertains to a result from the digital competition; and validating the result of the digital competition by collecting input from the first user group, the second user group, and a third user group.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for competitive arbitration comprising:
    subscribing, using a first computing device, a first user group and a second user group to a digital competition arbitration platform that oversees a digital competition;
    executing, using a second computing device, a digital contract using a digital ledger token between the first user group and the second user group, wherein the digital contract pertains to a result from the digital competition;

receiving a result of the digital competition between the first user group and the second user group, wherein the result is received by a third user group; and validating, using a third computing device, the result of the digital competition by collecting input from the first user group, the second user group, and the third user group.

2. The method of claim 1 wherein the third user group comprises one or more witness users.

3. The method of claim 2 wherein the third user group verifies the result from the digital competition.

4. The method of claim 2 wherein the one or more witness users perform a witness operation through an automated evaluation application.

5. The method of claim 1 further comprising arbitrating a dispute between the first user group and the second user group over the result from the digital competition using a fourth user group that votes on the result from the digital competition.

6. The method of claim 5 wherein the fourth user group comprises a jury pool.

7. The method of claim 5 wherein the fourth user group is compensated for the arbitrating.

8. The method of claim 7 determining a first subset of the fourth user group that voted in a majority as part of the arbitrating.

9. The method of claim 8 wherein the first subset is compensated for the arbitrating.

10. The method of claim 8 determining a second subset of the fourth user group that voted in a minority as part of the arbitrating.

11. The method of claim 10 wherein the second subset is compensated negatively.

12. The method of claim 1 wherein the digital competition is on a separate digital platform from the digital competition arbitration platform.

13. The method of claim 1 wherein the digital contract comprises a smart contract.

14. The method of claim 13 wherein the smart contract comprises a wager.

15. The method of claim 1 wherein the second computing device is an arbitration server.

16. The method of claim 15 wherein the arbitration server handles matchmaking between the first user group and the second user group.

17. The method of claim 15 wherein the first user group and the second user group are part of a multiplicity of user groups involved in the digital competition.

18. The method of claim 17 wherein the multiplicity of user groups compete in a round-robin type competition.

19. The method of claim 18 wherein the multiplicity of user groups are matched by the arbitration server.

20. The method of claim 1 wherein the digital ledger token comprises a cryptocurrency.

21. The method of claim 1 wherein the digital ledger token comprises blockchain technology.

22. The method of claim 1 wherein the digital contract is maintained using blockchain technology.

23. The method of claim 22 wherein data associated with the digital contract is maintained using blockchain technology.

24. The method of claim 1 wherein the digital competition arbitration platform is decentralized.

25. A computer program product embodied in a non-transitory computer readable medium for competitive arbitration, the computer program product comprising code which causes one or more processors to perform operations of:

subscribing a first user group and a second user group to a digital competition arbitration platform that oversees a digital competition;

executing a digital contract using a digital ledger token between the first user group and the second user group wherein the digital contract pertains to a result from the digital competition;

receiving a result of the digital competition between the first user group and the second user group, wherein the result is received by a third user group; and validating the result of the digital competition by collecting input from the first user group, the second user group, and the third user group.

26. A computer system for competitive arbitration comprising:

a memory which stores instructions;

one or more processors attached to the memory wherein the one or more processors, when executing the instructions which are stored, are configured to:

subscribe a first user group and a second user group to a digital competition arbitration platform that oversees a digital competition;

execute a digital contract using a digital ledger token between the first user group and the second user group wherein the digital contract pertains to a result from the digital competition;

receive a result of the digital competition between the first user group and the second user group, wherein the result is received by a third user group; and validate the result of the digital competition by collecting input from the first user group, the second user group, and the third user group.

\* \* \* \* \*